June 24, 1930.　　　F. D. POWELL　　　1,766,939
FRAME AND INDEX TAB THEREFOR
Filed April 25, 1928
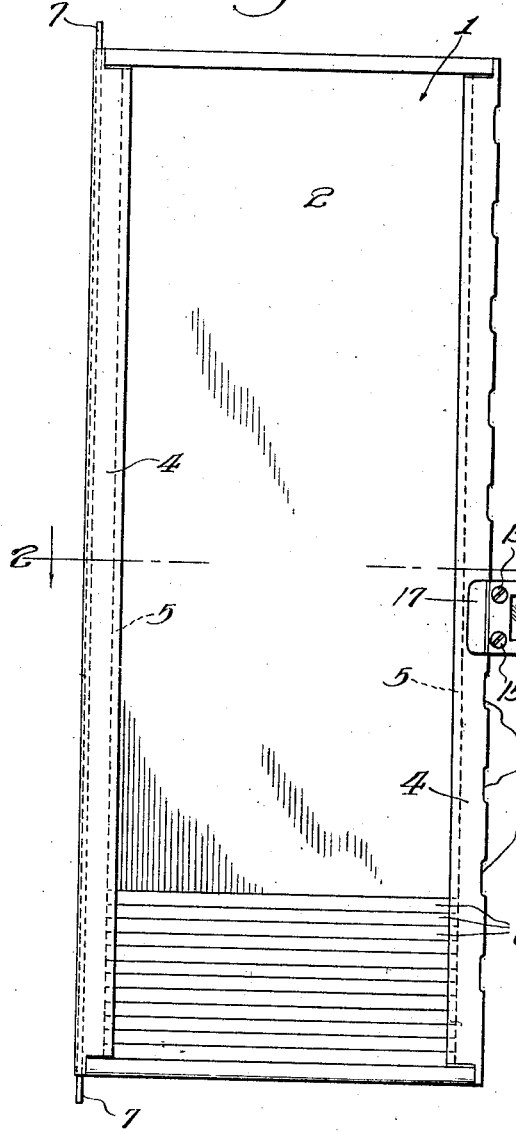
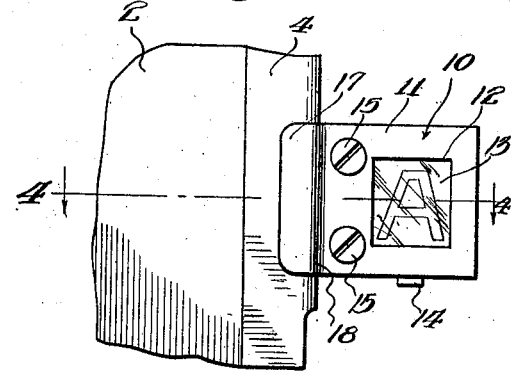
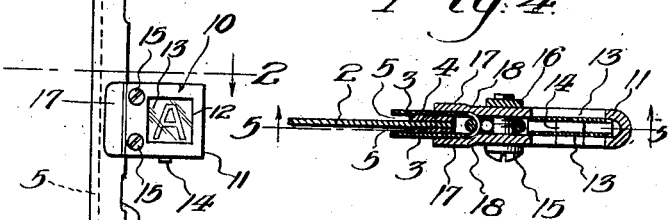
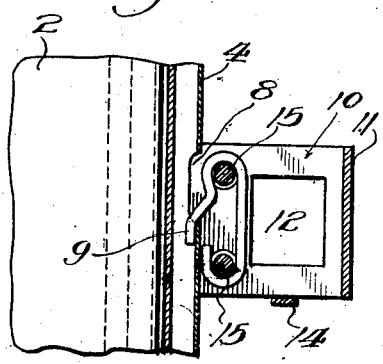
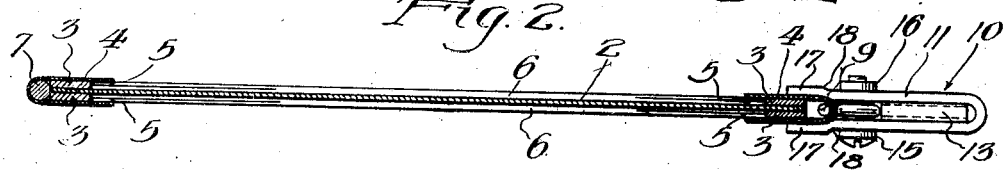
Witness:
Stephen H. Peloia
Inventor:
Frank D. Powell,
By Frank L. Belknap
Atty.

Patented June 24, 1930

1,766,939

UNITED STATES PATENT OFFICE

FRANK D. POWELL, OF CHICAGO, ILLINOIS, ASSIGNOR TO ACME CARD SYSTEM COMPANY, OF CHICAGO, ILLINOIS, A CORPORATION OF ILLINOIS

FRAME AND INDEX TAB THEREFOR

Application filed April 25, 1928. Serial No. 272,598.

The present invention refers more particularly to a novel method of detachably mounting an index tab on a frame for use with visible index or record equipment and the like.

In visible index and record equipment now in general use, index strips or record cards are mounted in adjacent and/or overlapping relation on suitable frames. It is the practice to pivotally mount these frames in a suitable stand whereby the various frames may be readily moved to the desired position for reference. An index tab is positioned on the outer edge of each frame to facilitate reference to the data carried by any frame. Since it is often desired to expand the index or record system, the tabs must necessarily be changed to a different position upon the frame or transferred to another frame, as the case may be. Thus, these index tabs should be readily removable from, or attachable to, the frame, while at the same time, the construction should be such that the tab, when in place on the frame, should be locked against unintended displacement.

It is an object of the present invention to provide a frame and index tab therefor having certain features of novelty or utility over those known to the prior art.

In the embodiment of the present invention, one marginal edge of a frame is provided with one or more apertures or slots opening to the edge thereof. The index tab preferably comprises a piece of metal bent intermediate its end to form spaced parallel walls between which is carried a hook member adapted to be inserted in said aperture in the frame for engaging the index tab on the frame.

As a feature of the present invention, the frame is so constructed as to present flat surfaces for engagement with the spaced parallel walls of the tab whereby to facilitate the engagement or disengagement of the index tab relative to the frame.

As another feature of the present invention, the arrangement is such that a portion of the hook member projects downwardly below the base of the particular aperture or slot in which the index tab is mounted, preventing unintended sidewise or downward displacement.

The improvement is characterized by the ease with which the index tab may be engaged with, or disengaged from, the frame, the hook member functioning as the holding means to prevent undesirable movement while the tab is on the frame. The improvement is also characterized by economy in manufacture, ease of assembly and disassembly, and by many other features.

Other objects and advantages of the present invention will be more apparent from the following description:

In the drawings, Fig. 1 is an elevational view of an index or card record frame illustrating the manner of attaching an index tab thereto according to the present invention.

Fig. 2 is a transverse sectional view taken on line 2—2 of Fig. 1 looking in the direction of the arrows.

Fig. 3 is an enlarged fragmentary elevational view illustrating an index tab attached to the frame.

Fig. 4 is a transverse sectional view taken on line 4—4 of Fig. 3.

Fig. 5 is a vertical sectional view taken on line 5—5 of Fig. 4 looking in the direction of the arrows.

Referring more in detail to the drawings, 1 designates as a whole a supporting frame for index strips, record cards or the like, which may be constructed substantially as follows: A flat web 2 of suitable material, such as metal, fibre, cardboard or the like, may have mounted and secured upon its upper and lower surfaces adjacent its opposite edges, spacing strips 3. Marginal members 4 made of metal or the like may be folded over the spacing strips 3, the inner edges of the former preferably projecting over the web 2 to a point beyond the inside edges of the spacing strips 4 to form channels or grooves 5 in which the index elements are insertible. These index elements may take the form of index strips 6 or may comprise record cards or the like.

The opposite ends of a pintle member 7 may extend beyond the upper and lower edges of the frame 1, whereby the latter may be pivotally mounted in a suitable stand (not shown). This pintle member 7 may be preferably secured to the frame 1 by folding one of the marginal members 4 over the same. The opposite marginal member 4 may be provided with one or more apertures or slots 8 along its folded edge, the slots 8 being adapted to be engaged by a hook member 9 carried by the index tab 10.

This index tab 10 may be constructed as follows: A body portion 11 made from a folded piece of sheet metal or the like may be provided with apertures 12 through which the index marker may be viewed. This index marker may preferably be interposed between sheets of celluloid 13. A piece of the body portion 11 may be turned out to form a small tongue 14 adapted to retain the celluloid sheets 13 and the index marker in the proper position relative to the apertures 12.

The hook member 9 may comprise a strip of wire bent to form a hook of the desired shape, and may be secured to the body portion 11 by means of one or more screws 15 having threaded engagement with a threaded member 16. These screws 15 also serve to cause the flanges 17 of the body portion 11 to firmly clamp the marginal member 4. These flanges 17 may preferably be offset from the plane of the remainder of the body portion 11, as shown at 18.

In the utilization of the device: When it is necessary to change the position of the index tab 10, the screws 15 may be unscrewed sufficient to permit disengagement and the tab slid upwardly until the hook member 9 becomes disengaged from the slot 8 of the marginal member 4. The tab 10 may be remounted upon the marginal member 4 at any point intermediate the height thereof by simply causing the hook member 9 to slip into one of the slots 8 of the marginal member 4 and thereafter sliding the tab 10 downwardly until the said hook member 9 engages the lower edge of the slot 8, after which the screws may be tightened.

The screws 15 perform two functions, one—they serve to hold the hook member 9 in its proper position between the spaced parallel walls of the index tab 10, and second—they function as means for securing the tab to the frame.

Heretofore, in devices of this character the arrangement was such that the grip between the tab and the frame was dependent entirely on the adjustment of the screws such as illustrated at 15 in the present invention. In use, the tabs would be unintentionally disengaged, destroying entirely the value of the tabs for their intended use.

While I have shown the hook member 9 as being formed from a separate piece of material, such as a bent portion of wire, it is to be understood that this hook may be formed by turning out a piece of the body portion 11 during the same operation in which the body portion is formed. It is also to be understood that I do not wish to limit the use of the tab of the present invention to index or card record equipment, nor to the particular type of frame illustrated.

I claim as my invention:

1. In combination, a frame having an aperture opening to a marginal edge, an index tab adapted for engagement with said frame comprising a body portion and a hook member positioned within said body portion, said hook member being adapted to engage in said marginal aperture.

2. In combination, a frame for index elements having a plurality of apertures opening to a marginal edge thereof, an index tab adapted for engagement with said frame comprising a body portion adapted to receive an index marker, flanges on said body portion adapted to engage the marginal edge of the frame, and a hook member associated with said body portion, said hook member being adapted to engage in an aperture on said marginal edge.

3. In combination, a frame for index elements having an aperture on a marginal edge, an index tab adapted for engagement with said frame and formed from a folded sheet of bendable material, said index tab comprising a body portion adapted to receive an index marker, and flanges on said body portion adapted to engage opposite faces of the marginal edge of said frame, adjustable means associated with said body portion adapted to maintain the flanges in predetermined spaced relation, and a hook member associated with said body portion adapted to engage in an aperture on said marginal edge.

4. In combination, a frame, one marginal edge of which is closed by a folded sheet of bendable material apertured on the line of fold, an index tab adapted for engagement with said frame, comprising a body portion and a hook member associated with said body portion, said hook member being adapted to engage in said marginal aperture.

5. In combination, a frame, one marginal edge of which is closed by a folded sheet of bendable material apertured on the line of fold, an index tab adapted for engagement with said frame, comprising a body portion and a hook member associated with said body portion, said hook member being adapted to engage in said marginal aperture, and said body portion being provided with flanges adapted to engage opposite faces of said folded sheet.

In testimony whereof I affix my signature.

FRANK D. POWELL.